July 22, 1969 R. B. WAY 3,456,617

WORK SUPPORT FIXTURE FOR A COATING MACHINE

Filed July 10, 1967 2 Sheets-Sheet 1

*INVENTOR.*
ROBERT B. WAY
BY
Charles L. Lombard
attorney

July 22, 1969  R. B. WAY  3,456,617

WORK SUPPORT FIXTURE FOR A COATING MACHINE

Filed July 10, 1967  2 Sheets-Sheet 2

INVENTOR.
ROBERT B. WAY
BY

United States Patent Office 3,456,617
Patented July 22, 1969

3,456,617
WORK SUPPORT FIXTURE FOR A COATING MACHINE
Robert B. Way, 439 Vermont Ave., Erie, Pa. 16505
Filed July 10, 1967, Ser. No. 652,110
Int. Cl. B05b 13/02, 13/00
U.S. Cl. 118—322        6 Claims

ABSTRACT OF THE DISCLOSURE

A fixture for carrying articles through a coating machine including a carrier bar which is mounted on a conveyor. A riser rod assembly is removably supported on the carrier bar and provides a plurality of rotatable article supporting shafts.

---

Automatic painting machines that have been made prior to the present time for painting small parts have had no provision for loading several of the parts simultaneously. On conveyor machines where the parts had to be rotated, the rotating mechanism moved with the parts through drying ovens and other areas where paint would dry in bearings, surfaces and other undesirable areas.

In the present disclosure, in the preferred embodiment of the invention, the parts are supported on a removable rotating riser rod assembly. The rod assembly has a plurality of rods each having an upper end equipped to support one of the parts. The rods each extend down and engage a connection on similar rods on a carrier bar. The rods on the carrier bar have rollers on them that engage rotating members on the painting machine. The riser rod assembly may be supported on the carrier bar while they pass through the painting chamber of the machine. The riser rod assembly may then be removed from the carrier bar and the parts and carrier bar together sent through dying ovens or subsequent treating chambers. Thus, residual paint is not baked in the bearings of the rotating riser rod assembly. The parts can be handled more efficiently on the carrier bar. The parts need not be touched in transferring them from machine to machine. The parts can be preloaded on the carrier bar, at a convenient station, separate from the machine. Necessary paint masks can be made as a part of the carrier bar where specific areas are to be masked and kept free of coating or plating.

It is, accordingly, an object of the invention to provide an improved fixture for use in a coating machine.

Another object of the invention is to provide an improved coating machine in combination with a fixture that is simple in construction, economical to manufacture, and simple and efficient to use.

Another object of the invention is to provide a fixture for a coating machine where a plurality of parts can be supported on the fixture and the fixture with the parts on it can be placed in a coating machine and removed therefrom and transferred to other stations in the manufacturing process.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
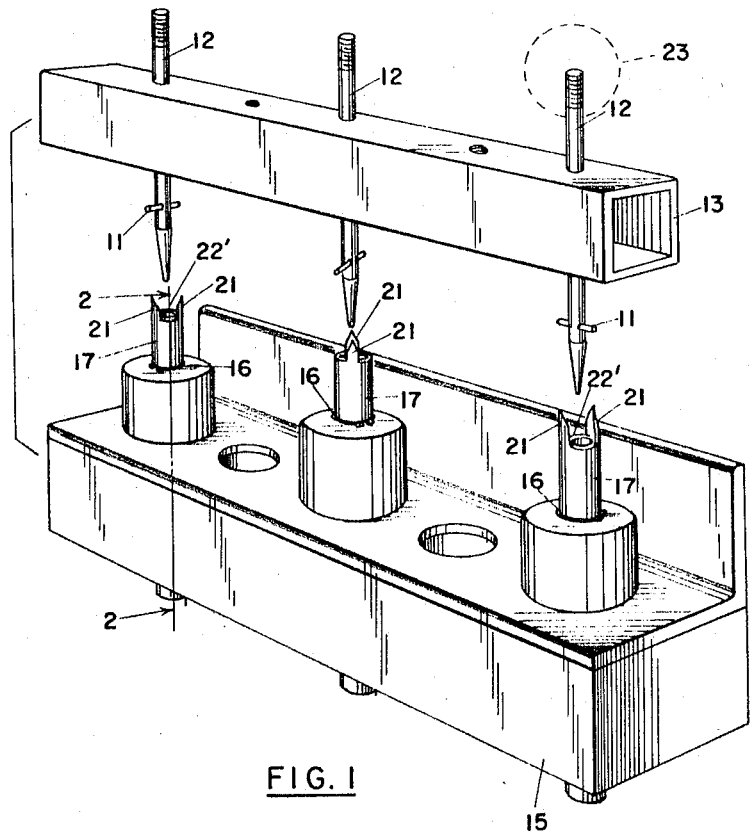
FIG. 1 is an isometric view of a coating machine according to the invention.
Figure 2:
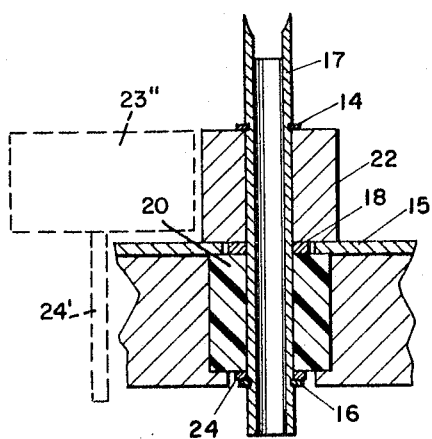
FIG. 2 is a longitudinal cross-sectional view taken on line 2—2 of FIG. 1.
Figure 3:
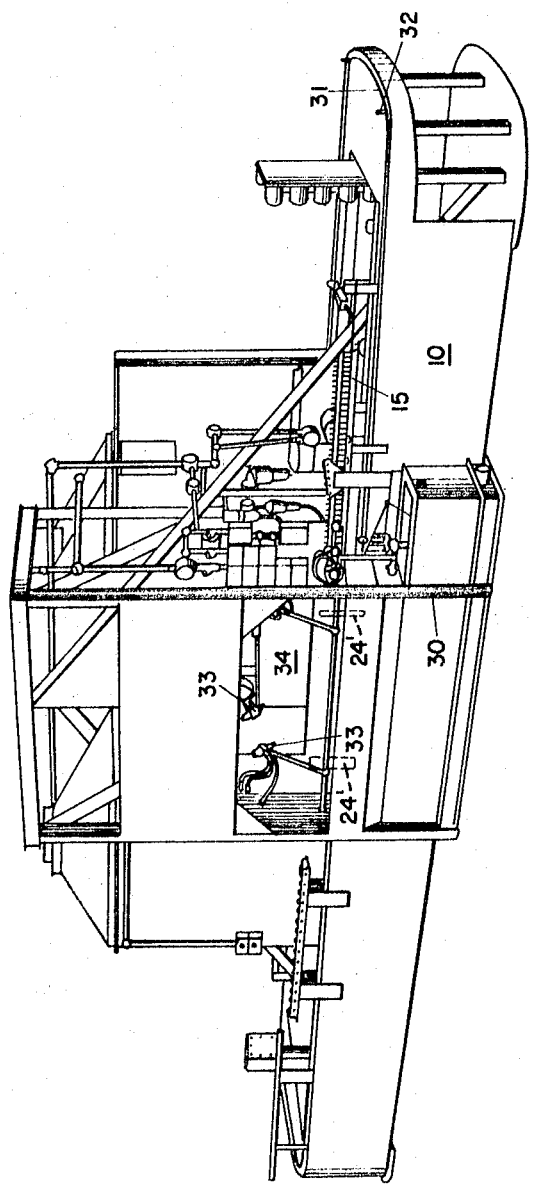
FIG. 3 is a schematic view of a machine on which the device shown in FIGS. 1 and 2 can be supported.

Now with more particular reference to the drawing, the painting machine is shown generally in 10. It has a frame indicated generally at 30 with a conveyor 31 made up of a continuous track that moves in a generally closed oval configuration. The track has the spaced upwardly extending pintles 32 on it on which the carrier bars 15 may be supported. The carrier bars have the space tubes 17 on them and, for example, five to fifty or more of the tubular members. The carrier bars 15 may be so constructed that they may be removed from the machine and the riser rods 13 may be removed from the carrier bars to load it at a convenient position remote from the machine by lifting the shaft 12 from the tubular members 17.

The rollers 22 are fixed to tubular members 17 and they will roll against driven pulleys 23' on the machine and driven by shafts 24' as the articles supported on the shaft 12 pass beneath the paint guns 33 in the painting chamber 34. When the articles have moved out of the paint chamber, the articles together with the rods 13 and shafts 12 may be lifter from the carrier bars 15 and placed in a suitable drying oven or other suitable position.

The riser rods 13 have the shafts 12 supported on them and they rotate in the riser rods 13 in suitable bearings. The lower ends of shafts 12 are tapered as shown to conveniently locate them in the openings in the tubular members 17 and the pins 11 will drop into the notches 22' between the lugs 21 so that the shafts 12 positively rotate with the tubular members 17. The upper ends of the shafts 12 are indicated as threaded and they may have any suitable holding device for holding an article to be painted supported on holders indicated generally at 23. This may be in the form of a mask holder, a stencil that has the inside formed to the contour of the exterior of the article to be painted so that only certain desired areas can be painted.

Tubular members 17 are supported in the anti-friction bearings 20 which are in turn supported in the carrier bars 15 and the tubular members 17 are held against vertical movement by the snap rings 14 and 16 that are set in suitable grooves in the tubular members. The spacers 18 are disposed between the rollers 22 and the bearings 20 and a like spacer 24 is supported between the snap rings 16 and the bearing 20.

During operation, articles to be painted are loaded on the holders 23. This may be done at some location spaced from the machine, then after loading the riser rods 13 with articles loaded on them are carried to the machine. The articles can then be painted by the machine and the articles and riser rods 15 lifted from tubular members 17 removed from the machine and together carried to another processing position.

The embodiments of the invention in which an exclusive property or privilege is claimed are defined as follows:

1. A fixture for an automatic coating machine comprising
    a rigid carrier bar,
    a plurality of elongated vertically extending members rotatably supported on said bar disposed generally parallel to each other,
    a roller on each said elongated member, each said roller being adapted to engage a rotatable member on said machine,
    a rigid riser rod assembly,
    a plurality of spaced shafts rotatably supported on said riser rod assembly, said spaced shafts each having a first and a second end, means on said first end of each said shaft for supporting an article to be painted, means on said second end of each said shaft adapted to engage a said elongated member whereby said spaced shafts are each rotated by a said elongated member, said riser rod assembly being freely removable from said carrier bar.

2. The fixture recited in claim 1 wherein said elongated members are tubular and said means on said second ends of said shaft comprise a tapered end adapted to enter said tubular member.

3. The fixture recited in claim 2 wherein means on the end of said elongated member comprises a notch in the end thereof and said shafts each have a transverse pin adapted to be received in said notch.

4. The fixture recited in claim 1 wherein said elongated members are supported on said carrier bar by means of anti-friction bearings.

5. In combination, an automatic painting machine and the fixture recited in claim 1, said painting machine having paint dispensing means, said painting machine having a rotatable member thereon adjacent said paint dispensing means, said rotatable member engaging the outer periphery of said roller as said fixture passes said roller whereby articles on said fixture may be rotated while they are being painted and engaging said rollers on said fixture, said painting machine having a conveyor passing adjacent said paint dispensing means and said carrier bar being supported on said conveyor.

6. The combination recited in claim 5 wherein said paint dispensing means comprises spray guns.

References Cited

German printed application, Rudolph Anger, No. 1,172,161, June 11, 1964.

WALTER A. SCHEEL, Primary Examiner

JOHN P. McINTOSH, Assistant Examiner

U.S. Cl. X.R.

118—500